US012709384B2

(12) United States Patent
Peekema et al.

(10) Patent No.: US 12,709,384 B2
(45) Date of Patent: Aug. 18, 2026

(54) SYSTEMS AND METHODS FOR MONITORING A GEAR RETRACT BRAKING LOAD ALLEVIATION SYSTEM

(71) Applicant: THE BOEING COMPANY, Arlington, VA (US)

(72) Inventors: Andrew Thomas Peekema, Bothell, WA (US); Nima Forghani, Seattle, WA (US); Logan Hamel, Bothell, WA (US)

(73) Assignee: THE BOEING COMPANY, Arlington, VA (US)

( * ) Notice: Subject to any disclaimer, the term of this patent is extended or adjusted under 35 U.S.C. 154(b) by 99 days.

(21) Appl. No.: 18/606,025

(22) Filed: Mar. 15, 2024

(65) Prior Publication Data

US 2025/0289565 A1 Sep. 18, 2025

(51) Int. Cl.
*B64C 25/28* (2006.01)
*B64D 45/00* (2006.01)

(52) U.S. Cl.
CPC ........ *B64C 25/28* (2013.01); *B64D 2045/008* (2013.01); *B64D 2045/0085* (2013.01)

(58) Field of Classification Search
CPC .............. B64C 25/28; B64D 2045/008; B64D 2045/0085
See application file for complete search history.

(56) References Cited

U.S. PATENT DOCUMENTS 6,704,634 B1 * 3/2004 Gowan ................. B64C 25/426 244/50
8,463,462 B2 6/2013 Cahill
10,933,982 B2 3/2021 Hubbard et al.
2002/0193920 A1 * 12/2002 Miller .................... G06Q 50/40 701/9
2010/0281967 A1 * 11/2010 Cahill .................... B64D 45/00 73/146
2017/0096037 A1 * 4/2017 Smith ................. B60C 23/0488
2017/0355473 A1 * 12/2017 Cahill ..................... B64C 25/34
2019/0263511 A1 8/2019 Plude et al.
2020/0172066 A1 6/2020 Burte
2021/0300313 A1 * 9/2021 Robertson ............... F16D 66/00
2021/0347350 A1 * 11/2021 Bains ...................... B64C 25/44
2022/0348318 A1 11/2022 Howell et al.
2024/0343399 A1 * 10/2024 Amari .................... B64D 45/00

FOREIGN PATENT DOCUMENTS

EP 3909818 A1 11/2021

OTHER PUBLICATIONS

Extended European Search Report for application No. 25155159.4 dated May 30, 2025, pp. 1-10.

* cited by examiner

*Primary Examiner* — Donald J Wallace
*Assistant Examiner* — Jalal C Coduroglu
(74) *Attorney, Agent, or Firm* — Moore IP Law

(57) ABSTRACT

A method for monitoring a gear retract braking load alleviation system includes receiving, from a wheel speed sensor associated with a wheel of a landing gear during an in-air operation, a plurality of wheel speed measurements. The method includes determining a landing gear load metric based on the plurality of wheel speed measurements. The method also includes, in response to the landing gear load metric satisfying a landing gear load threshold, generating an alert indicating a potential maintenance issue associated with the landing gear.

20 Claims, 4 Drawing Sheets

SYSTEMS AND METHODS FOR MONITORING A GEAR RETRACT BRAKING LOAD ALLEVIATION SYSTEM

FIELD OF THE DISCLOSURE

The subject disclosure is generally related to systems and methods for monitoring a gear retract braking (GRB) load alleviation system.

BACKGROUND

Some aircraft are supported on the ground by landing gear systems that retract into a body of the aircraft after takeoff of the aircraft. Each landing gear of a landing gear system may include a shock strut (e.g., an oleo-pneumatic shock) and one or more wheels. The landing gear systems may include a nose landing gear system and two main landing gear systems. The nose landing gear system may include a shock strut with a pair of wheels. The wheels of the nose landing gear system do not include a braking system, and rotation of the wheels of the nose landing gear system after takeoff is stopped by contact with brake linings mounted in a wheel well of the aircraft.

Each landing gear of the main landing gear systems includes a shock strut with one or more pairs of wheels. Each wheel of a main landing gear system includes multiple-disc brakes. The multiple-disc brakes may be hydraulically powered or otherwise powered (e.g., using electromagnets). When hydraulically powered, separate normal and alternate brake hydraulic systems provide active and passive sources for hydraulic brake power used to provide braking and antiskid control for the aircraft after landing. Selection of the alternate brake hydraulic system is automatic upon detection of a loss of hydraulic system pressure for the normal brake hydraulic system. The normal and alternate brake hydraulic systems have separate hydraulic components, which are joined before connecting to the brakes with shuttle valves. Common brake lines (e.g., one for each wheel) continue to the multiple-disc brakes of the wheels.

After takeoff of the aircraft, a hydraulic landing gear retraction system engages to retract the wheels of the landing gear systems into wheel wells. The hydraulic landing gear retraction system includes a GRB load alleviation system that stops rotation of the wheels of the main landing gear systems in a controlled manner to avoid application of high loads to components of the main landing gear systems. Before the landing gear is fully retracted, brake pressure is applied to stop the wheels before entering the wheel wells. This brake pressure is decreased from airplane system pressure, limited in flow, staggered in application, and actively controlled through electrohydraulic servo valves in order to reduce gear loads. The combination of these factors causes application of reduced torque to the multiple disc brakes as compared to when the wheels are stopped too quickly. Use of the GRB load alleviation system moderates the loads applied to components of the shock strut and other components of the main landing gear system that may be critically affected by high loads (e.g. shock strut hard stops and intermediate structure connecting the wheels to the shock struts).

The aircraft may include a system to monitor the GRB load alleviation system to detect issues with the GRB alleviation system. Some existing monitors for GRB systems include monitors coupled to particular components of the GRB load alleviation systems, but such monitors may not indicate issues when one or more non-monitored components are not operating normally. Monitoring all components of the GRB load alleviation systems may be impractical due to complexity, reliability, availability of data processing resources, and weight considerations. Other existing monitors of GRB load alleviation systems directly measure load via sensors (e.g., strain gauges), but such monitors add complexity, weight, and may need to be frequently calibrated to ensure reliability of output. It is desirable to provide a monitor system for a GRB load alleviation system that monitors operation of the GRB load alleviation system as a whole, without a need for directly measuring load.

SUMMARY

In a particular implementation, a method includes receiving, from a wheel speed sensor associated with a wheel of a landing gear during an in-air operation, a plurality of wheel speed measurements. The method includes determining a landing gear load metric based on the plurality of wheel speed measurements. The method also includes, in response to the landing gear load metric satisfying a landing gear load threshold, generating an alert indicating a potential maintenance issue associated with the landing gear.

In another particular implementation, a system includes one or more processors configured to receive, from a wheel speed sensor associated with a wheel of a landing gear, a plurality of wheel speed measurements. The one or more processors are configured to determine a landing gear load metric based on the plurality of wheel speed measurements. The one or more processors are also configured to, in response to a determination that the landing gear load metric satisfies a landing gear load threshold, generate an alert indicating a potential maintenance issue associated with the landing gear.

In another particular implementation, a non-transitory computer-readable medium includes instructions that, when executed by one or more processors, cause the one or more processors to receive, from a wheel speed sensor associated with a wheel of a landing gear, a plurality of wheel speed measurements. The instructions cause the one or more processors to determine a landing gear load metric based on the plurality of wheel speed measurements. The instructions further cause the one or more processors to, in response to a determination that the landing gear load metric satisfies a landing gear load threshold, generate an alert indicating a potential maintenance issue associated with the landing gear.

In another particular implementation, a device includes means for receiving, from a wheel speed sensor associated with a wheel of a landing gear during an in-air operation, a plurality of wheel speed measurements. The device also includes means for determining a landing gear load metric based on the plurality of wheel speed measurements. The device also includes means for generating, in response to the landing gear load metric satisfying a landing gear load threshold, an alert indicating a potential maintenance issue associated with the landing gear.

DETAILED DESCRIPTION

An aircraft may be equipped with one or more GRB load alleviation systems to stop rotation of wheels of main landing gear systems after takeoff in a controlled manner to avoid application of high loads to components of the main landing gear systems due to quickly stopping rotation of the wheels. The GRB load alleviation systems may be monitored to determine when there are issues with the one or more GRB load alleviation systems. Issues with the one or more GRB load alleviation systems could cause issues with the main landing gear systems.

A technical advantage of the subject disclosure is the ability to monitor operation of the GRB load alleviation systems as a whole to determine issues, instead of monitoring the individual components of the GRB load alleviation systems. Additionally, the systems and methods of the subject disclosure use output of wheel speed sensors already installed on a landing gear to monitor the GRB load alleviation systems.

Another technical advantage of the subject disclosure in some aspects is the use of a dynamic model of the GRB load alleviation system to predict mechanical loads on system components from the wheel speed sensors, which eliminates potentially problematic reliance on direct measurement of loads (e.g., by use of strain gages). Another technical advantage of the subject disclosure is the agnosticism of the systems and methods disclosed herein toward the type of brake in a landing gear braking system. The subject disclosure is applicable for hydraulic brakes, electric brakes, etc.

The figures and the following description illustrate specific exemplary implementations. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific implementations or examples described below, but by the claims and their equivalents.

Figure 1:
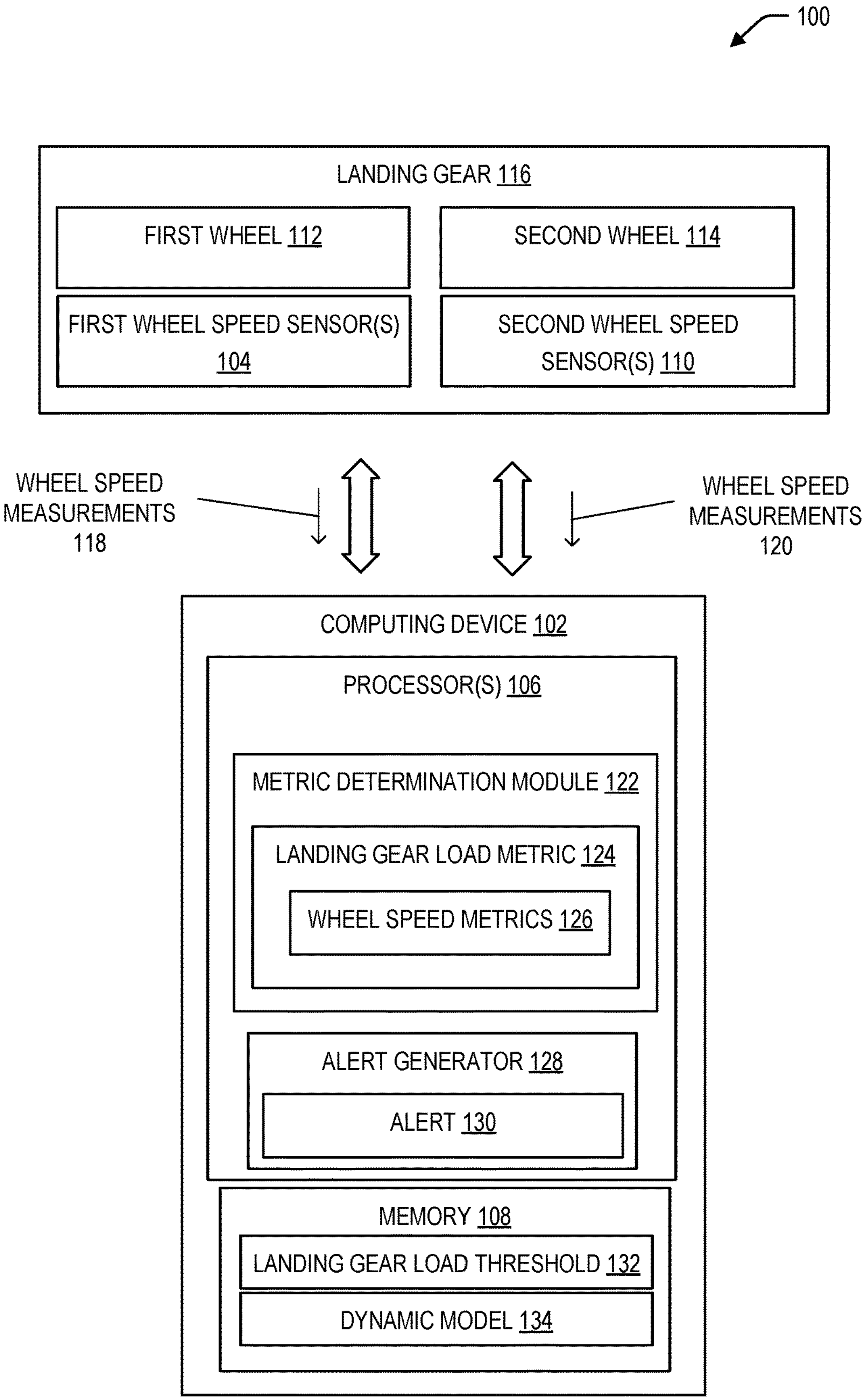
FIG. 1 depicts an example system for monitoring a GRB load alleviation system, in accordance with some examples of the subject disclosure.

Particular implementations are described herein with reference to the drawings. In the description, common features are designated by common reference numbers throughout the drawings. As used herein, various terminology is used for the purpose of describing particular implementations only and is not intended to be limiting. For example, the singular forms “a,” “an,” and “the” are intended to include the plural forms as well, unless the context clearly indicates otherwise. Further, some features described herein are singular in some implementations and plural in other implementations. To illustrate, FIG. 1 depicts a system 100 including one or more processors (“processor(s)” 106 in FIG. 1), which indicates that in some implementations the system 100 includes a single processor 106 and in other implementations the system 100 includes multiple processors 106. For ease of reference herein, such features are generally introduced as “one or more” features and are subsequently referred to in the singular or optional plural (as indicated by “(s)”) unless aspects related to multiple of the features are being described.

The terms “comprise,” “comprises,” and “comprising” are used interchangeably with “include,” “includes,” or “including.” Additionally, the term “wherein” is used interchangeably with the term “where.” As used herein, “exemplary” indicates an example, an implementation, and/or an aspect, and should not be construed as limiting or as indicating a preference or a preferred implementation. As used herein, an ordinal term (e.g., “first,” “second,” “third,” etc.) used to modify an element, such as a structure, a component, an operation, etc., does not by itself indicate any priority or order of the element with respect to another element, but rather merely distinguishes the element from another element having a same name (but for use of the ordinal term). As used herein, the term “set” refers to a grouping of one or more elements, and the term “plurality” refers to multiple elements.

As used herein, “generating,” “calculating,” “using,” “selecting,” “accessing,” and “determining” are interchangeable unless context indicates otherwise. For example, “generating,” “calculating,” or “determining” a parameter (or a signal) can refer to actively generating, calculating, or determining the parameter (or the signal) or can refer to using, selecting, or accessing the parameter (or signal) that is already generated, such as by another component or device. As used herein, “coupled” can include “communicatively coupled,” “electrically coupled,” or “physically coupled,” and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, “directly coupled” is used to describe two devices that are coupled (e.g., communicatively coupled, electrically coupled, or physically coupled) without intervening components.

FIG. 1 depicts an example system 100 for monitoring a GRB load alleviation system of an aircraft, in accordance with some examples of the subject disclosure. In some implementations, the system 100 includes a computing device 102 configured to communicate with one or more first wheel speed sensors 104 and/or one or more second wheel speed sensors 110.

In some implementations, the first wheel speed sensor(s) 104 includes one or more components configured to provide a first plurality of wheel speed measurements 118 associated with a first wheel 112 of a landing gear 116 during an in-air operation. The second wheel speed sensor(s) 110 includes one or more components configured to provide a second plurality of wheel speed measurements 120 associated with a second wheel 114 of the landing gear 116 during an in-air operation. The aircraft may include two or more landing gears 116. In FIG. 1, the landing gear 116 includes a pair of wheels 112, 114, but in other implementations, the landing gear 116 may include one or more additional pairs of wheels.

In some aspects, the first plurality of wheel speed measurements 118 and/or the second plurality of wheel speed measurements 120 can include one or more types of measurements associated with the rotational speed of the respective wheel 112, 114. For example, the wheel speed measurements 118, 120 can include direct wheel speed measurements, wheel position measurements over time, etc. In some configurations, the wheel speed measurements 118, 120 can include additional data associated with wheel speed to contextualize the wheel speed measurements 118, 120. For example, if some portion of the wheel speed measurements 118, 120 include wheel position measurements, additional data identifying respective timestamps for each wheel position measurements can be included in the wheel speed measurements 118, 120. In other configurations, this additional data can be communicated to the computing device 102 separately, or some combination thereof.

In some implementations, the computing device 102 includes one or more processors 106 coupled to a memory 108. The processor(s) 106 are configured to receive the first plurality of wheel speed measurements 118, the second plurality of wheel speed measurements 120, or some combination thereof. In some aspects, the processor(s) 106 includes a metric determination module 122 and an alert generator 128.

The metric determination module 122 can be configured to determine a landing gear load metric 124 based on the received wheel speed measurements 118, 120. In some aspects, the metric determination module 122 can be configured to determine the landing gear load metric 124 based on wheel speed metrics 126 determined for each wheel 112, 114 of the landing gear 116. A first wheel speed metric 126 for the first wheel 112 is based on the first plurality of wheel speed measurements 118, and a second wheel speed metric 126 for the second wheel 114 is based on the second plurality of wheel speed measurements 120.

In some aspects, the landing gear load metric 124 can be based on one or more metrics associated with a GRB load. For example, the landing gear load metric 124 can include a wheel acceleration metric associated with the first wheel 112, the second wheel 114, or a combination thereof.

In some implementations, the processor(s) 106 can be configured to determine whether the landing gear load metric 124 satisfies a landing gear load threshold 132, which can be retrieved from the memory 108. For example, the landing gear load threshold 132 can include data indicative of a combined wheel acceleration limit of −300 rad/s/s over 0.125 seconds cumulatively per landing gear retraction. In other implementations, the wheel acceleration limit and the cumulative time limit may have other values. The metric determination module 122 can be configured to generate the landing gear load metric 124 based on the first plurality of wheel speed measurements 118, the second plurality of wheel speed measurements 120, or a combination thereof. The processor(s) 106 can be configured to determine whether the wheel speed measurements 118, 120 indicate that the acceleration of the first wheel 112 and/or the second wheel 114 is less than the landing gear load threshold 132. In a particular implementation, the processor(s) 106 can be configured to determine whether the wheel speed measurements 118, 120 indicate a wheel acceleration of less than −300 rad/s/s and then generate a time value associated with the wheel speed measurements 118, 120. If the time value is greater than 0.125 seconds, the processor(s) 106 can be configured to count an instance indicating the landing gear load metric 124 satisfies the landing gear load threshold 132 and one or more of the wheels 112, 114 are decelerating too quickly.

In some aspects, the metric determination module 122 can be configured to determine the landing gear load metric 124 based on a dynamic model 134, which can be retrieved from the memory 108. The dynamic model 134 can include one or more parameters, data values, relationships, etc., associated with the GRB load alleviation system. The dynamic model 134 can enable prediction of loads from a state of the GRB load alleviation system rather than from sensing the loads directly. For example, the dynamic model 134 can model a cantilevered rotating inertia sitting on a hardstop. Such a dynamic model 134 can be integrated by using a discrete-time ordinary differential equation solving method (e.g., a Runge-Kutta method) to find estimated gear loads. In other configurations, the dynamic model 134 can include additional springs; dampers; rotating inertias; brakes; hardstops; pivots; gas or hydraulic chambers and valves; electric, gas, or hydraulic actuators; or other components. In the same or alternative configurations, the dynamic model 134 can include considerations for static and dynamic friction, temperature, pressure, other variables, or some combination thereof.

The dynamic model 134 can be used to enable prediction of loads from component states and system states of the GRB load alleviation system. Component states can include, for example, brake inertia and tire inertia. Brake inertia can be estimated based on one or more brake wear measurements, and tire inertia can be based on one or more tire wear measurements. Other component states and system states can include whether the landing gear is being retracted; whether the aircraft is accelerating; air loads; whether the landing gear has multiple configurations (i.e., the landing gear is a semi-levered gear); whether the wheels, tires, brakes, or a combination thereof, have multiple configurations; whether the brake system or other control system has multiple states; etc.

In some configurations, inputs to the dynamic model 134 can include one or more measurements, calculations, data values, data derivations, etc., associated with a state of the GRB load alleviation system. For example, inputs can include brake pressure, electrohydraulic servo valve pressure, brake metering valve pressure, shock strut fluid pressure, shock strut fluid temperature, brake temperature, brake force or torque, landing gear component force or torque, electric brake actuator measurements (e.g., position, velocity, acceleration, force, voltage, current, etc.), brake heatsink wear (e.g., obtained via position measurement or indirectly estimated), landing gear position state(s) (e.g., obtained from control lever positions, gear latch states, proximity sensors, etc.), wheel position, wheel speed, wheel acceleration, jerk sensor(s), inertial sensor(s) on a wheel, inertial sensor(s) on a tire, inertial sensor(s) on a brake, inertial sensor(s) on a landing gear, inertial sensor(s) on a fuselage, etc.

In a particular aspect, the processor(s) 106 can also be configured to filter one or more inputs of the dynamic model 134 as part of an error reduction process, an error correction process, or some combination thereof. If one or more of the inputs to the dynamic model 134 result in an error of the system 100 (e.g., unnecessary false positives), one or more of the inputs can be filtered to improve the performance of the dynamic model 134.

In response to the landing gear load metric 124 satisfying the landing gear load threshold 132, the alert generator 128 can be configured to generate an alert 130 indicating a potential maintenance issue associated with the landing gear 116. The alert 130 can include, for example, a visual alert, audio alert, haptic alert, text-based alert (e.g., a log entry, message to flight crew and/or maintenance personnel, etc.), other appropriate alert, or a combination thereof.

In some aspects, the alert 130 is based on a characteristic of output from the dynamic model 134. For example, output from the dynamic model 134 can include an acceleration limit associated with the wheel(s) 112, 114 of the landing gear 116. To illustrate, if acceleration of the first wheel 112, the second wheel 114, or both, satisfied an acceleration threshold, the dynamic model 134 can indicate that a particular operating mode or set of operating modes is not a normal operating mode.

In a particular aspect, the potential maintenance issue is associated with a particular operating mode. For example, the particular operating mode can allow the GRB load alleviation system to provide one or more large impulses to the landing gear(s) 116. The particular operating mode can allow the one or more wheels 112, 114 to decelerate too quickly. The particular operating mode may be associated with one or more GRB load alleviation system components that allow rapid deceleration of the wheels 112, 114. This can include one or more electrohydraulic servo valves (e.g., one or more antiskid valves), one or more brake metering valves, or combinations thereof, that allow rapid deceleration of the wheels 112, 114.

As an illustrative operation, the system 100 can be implemented using a counter that decrements after a certain number of known good cycles and a gear cycle count. The counter is initially set to zero and is utilized so that a number of not-normal operating modes need to be detected before an alert is generated that identifies an issue. The gear cycle count is also initially set to zero. Detection of an issue by the monitor system for the GRB load alleviation system does not require any action from pilots of the aircraft and does not need to be immediately addressed. The system 100 is initiated each time a gear handle moves to an "up" position (i.e., when the landing gear retraction system is activated). During an in-air operation, the first wheel speed sensor 104 communicates the first plurality of wheel speed measurements 118 to the computing device 102, and the second wheel speed sensor 110 communicates the second plurality of wheel speed measurements 120 to the computing device 102. After determining the landing gear load metric 124 based on the wheel speed measurements 118, 120 and output of the dynamic model 134, if the landing gear load metric 124 satisfies the landing gear load threshold 132, the computing device 102 indicates a particular operating mode of the GRB load alleviation system that is not a normal operating mode, increments the counter by 1, and sets a number of gear cycles to 0. After completion of landing gear retraction, the counter is decreased by 1 if the number of gear cycles is equal to or greater than a gear cycle threshold (e.g., 100, 50, or some other number of cycles) and the GRB load alleviation system waits for the next activation of the landing gear retraction system. If the counter is less than a counter threshold (e.g., 10 or some other particular number), the GRB load alleviation system waits for the next activation of the landing gear retraction system.

If the counter equals the counter threshold, the particular operating mode is an active particular operating mode and the alert 130 is generated. An associated message can provide troubleshooting details based on the landing gear load metric(s) 124. The use of the counter and the gear cycle number may be suspended until the maintenance is performed. An additional alert 130 and associated message may be generated if the landing gear load metric(s) 124 for subsequent cycles indicate additional troubleshooting details different than the troubleshooting details associated with the active particular operating mode.

In some implementations, the computing device 102 can be associated with, integrated into, or otherwise included in an aircraft. The system 100 can also include components not illustrated in FIG. 1. For example, the computing device 102 can also include a receiver configured to receive the first plurality of wheel speed measurements 118, the second plurality of wheel speed measurements 120, or a combination thereof. The receiver can be configured to receive the data, for example, via a computer bus. As an additional example, the system 100 can also include one or more input/output interfaces, one or more network interfaces, etc. Further, although FIG. 1 illustrates the memory 108 of the system 100 as storing certain data, more, fewer, and/or different data can be present within the memory 108 without departing from the scope of the subject disclosure.

Additionally, although FIG. 1 illustrates certain operations occurring within the computing device 102, these operations can be performed by other components of the system 100 without departing from the scope of the subject disclosure. For example, one or more components external to the computing device 102 can be configured to host or otherwise incorporate some or all of the components of the metric determination module 122, the alert generator 128, or some combination thereof. Such component(s) can be located remotely from the computing device 102 and accessed via a modem of the computing device 102. As an additional example, the memory 108 can be one or more storage devices, and those storage devices can be located remote from the computing device 102, remote from one another, or a combination thereof.

Further, although FIG. 1 illustrates the computing device 102, the first wheel 112, the second wheel 114, and the landing gear 116 as separate, other configurations are possible without departing from the scope of the subject disclosure. For example, the computing device 102 can be integrated into one or more components of the landing gear 116. As an additional example, one or more components of the computing device 102 can be distributed across a plurality of computing devices (e.g., a group of processor cores).

Figure 2:
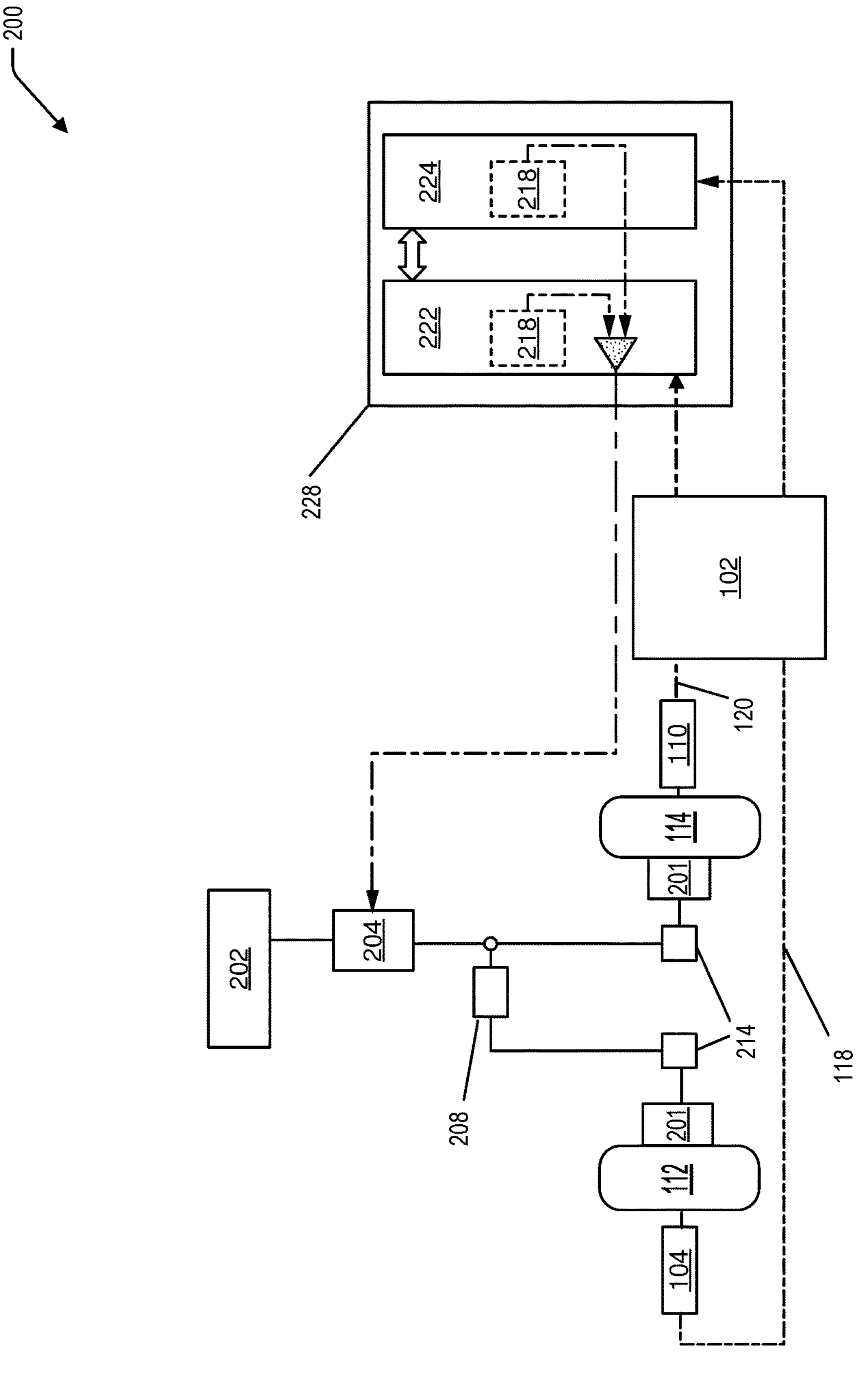
FIG. 2 illustrates an example GRB load alleviation system, in accordance with some examples of the subject disclosure.

FIG. 2 illustrates an example GRB load alleviation system 200, in accordance with some examples of the subject disclosure. In the example system 200, the computing device 102 of FIG. 1 is inserted into an existing GRB load alleviation system without requiring additional sensors to be placed within the system.

In some implementations, the system 200 includes an antiskid autobrake control unit (AACU) 228 coupled to a system containing a brake metering valve 202 that meters pressure to brakes 201 coupled to the first wheel 112 and the second wheel 114. The AACU is an electronic device configured to control the antiskid and autobrake components used to control the braking of the first wheel 112 and the second wheel 114. In some aspects, the AACU 228 includes a first antiskid card 222 coupled to a second antiskid card 224. Each of the antiskid cards 222, 224 include a gear retract braking load alleviation proportional/integral control module 218 configured to provide control signals to an antiskid valve 204. The AACU 228 is also configured to receive the first plurality of wheel speed measurements 118 from the first wheel speed sensor 104 coupled to the first wheel 112, and to receive the second plurality of wheel speed measurements 120 from the second wheel speed sensor 110 coupled to the second wheel 114. In some implementations, the antiskid valve 204 enables load alleviation for the first wheel 112 and the second wheel 114 after takeoff. In some aspects, the antiskid valve 204 can be coupled to the wheels 112, 114 via restrictor check valve 208 and flow limiters 214. In some aspects, a restrictor check valve 208 may be coupled between a fuse and a shuttle valve associated with one of the wheels 112, 114. For example, the restrictor check 208 shown in FIG. 2 is coupled between a fuse and a shuttle valve associated with the first wheel 112.

In some implementations, the system 200 controls braking of the wheels 112, 114 of the main landing gear systems of an aircraft after takeoff of the aircraft. The AACU 228 can use the wheel speed measurements 118, 120 to control the load alleviation of the wheels 112, 114. By adding the computing device 102 to the GRB load alleviation system, the system 200 can monitor the components of the GRB load alleviation system without adding additional sensors to the GRB load alleviation system. Although the computing device 102 is illustrated as separate from other components of the system 200, one or more components of the computing device 102 can be associated with, integrated into, or otherwise included in the GRB load alleviation system. For example, the computing device 102 can be integrated with the AACU 228 in a single electronic device.

Figure 3:
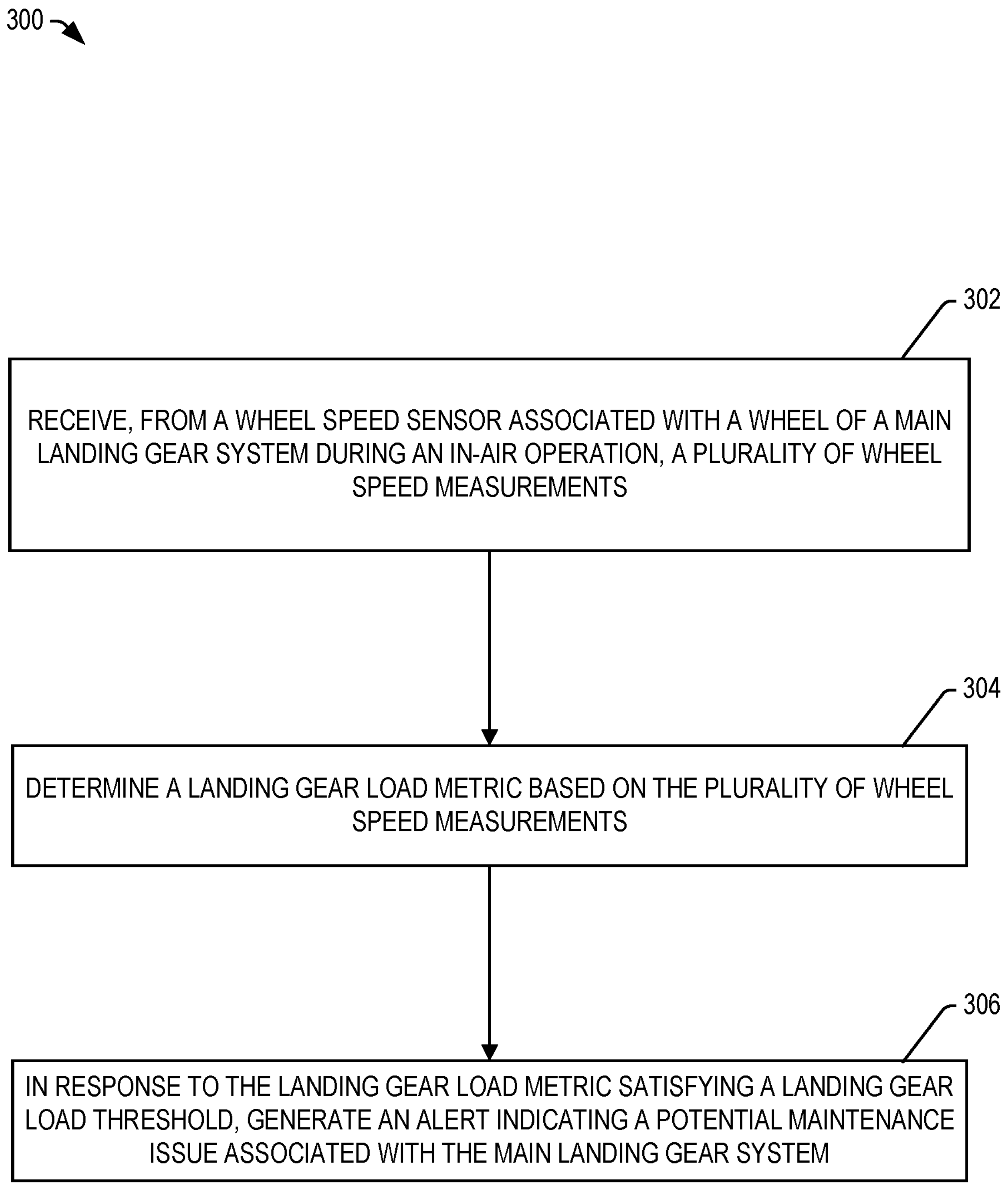
FIG. 3 is a flow chart of an example method for monitoring a GRB load alleviation system, in accordance with some examples of the subject disclosure.

FIG. 3 is a flow chart of an example method 300 for monitoring a GRB load alleviation system, in accordance with some examples of the subject disclosure. The method 300 can be initiated, performed, or controlled by one or more processors executing instructions, such as by the processor (s) 106 of FIG. 1 executing instructions from the memory 108.

In some implementations, the method 300 includes, at block 302, receiving, from a wheel speed sensor associated with a wheel of a main landing gear system during an in-air operation, a plurality of wheel speed measurements. For example, the processor(s) 106 of FIG. 1 can receive a plurality of wheel speed measurements 118, 120 from wheel speed sensors 104, 110 associated with the wheels 112, 114 of a landing gear 116 during an in-air operation.

The method 300 includes, at block 304, determining a landing gear load metric based on the plurality of wheel speed measurements. For example, the processor(s) 106 of FIG. 1 can determine the landing gear load metric 124 based on the plurality of wheel speed measurements 118, 120.

The method 300 also includes, at block 306, in response to the landing gear load metric satisfying a landing gear load threshold, generating an alert indicating a potential maintenance issue associated with the main landing gear system. For example, the processor(s) 106 of FIG. 1 can, in response to the landing gear load metric 124 satisfying a landing gear load threshold 132, generate an alert 130 indicating a potential maintenance issue associated with the landing gear 116.

In some implementations, the method 300 can include more, fewer, and/or different steps without departing from the scope of the subject disclosure. For example, the method 300 can also include filtering an input of a dynamic model as part of an error reduction process. As another example, the method 300 can also include filtering an output of the dynamic model as part of an error correction process.

Further, the methods described above with reference to FIGS. 1 and 2 can be implemented to realize one or more of the technical advantages described in more detail above. For example, the method 300 can enable monitoring of the health of a GRB load alleviation system without additional sensors added to a system.

Figure 4:
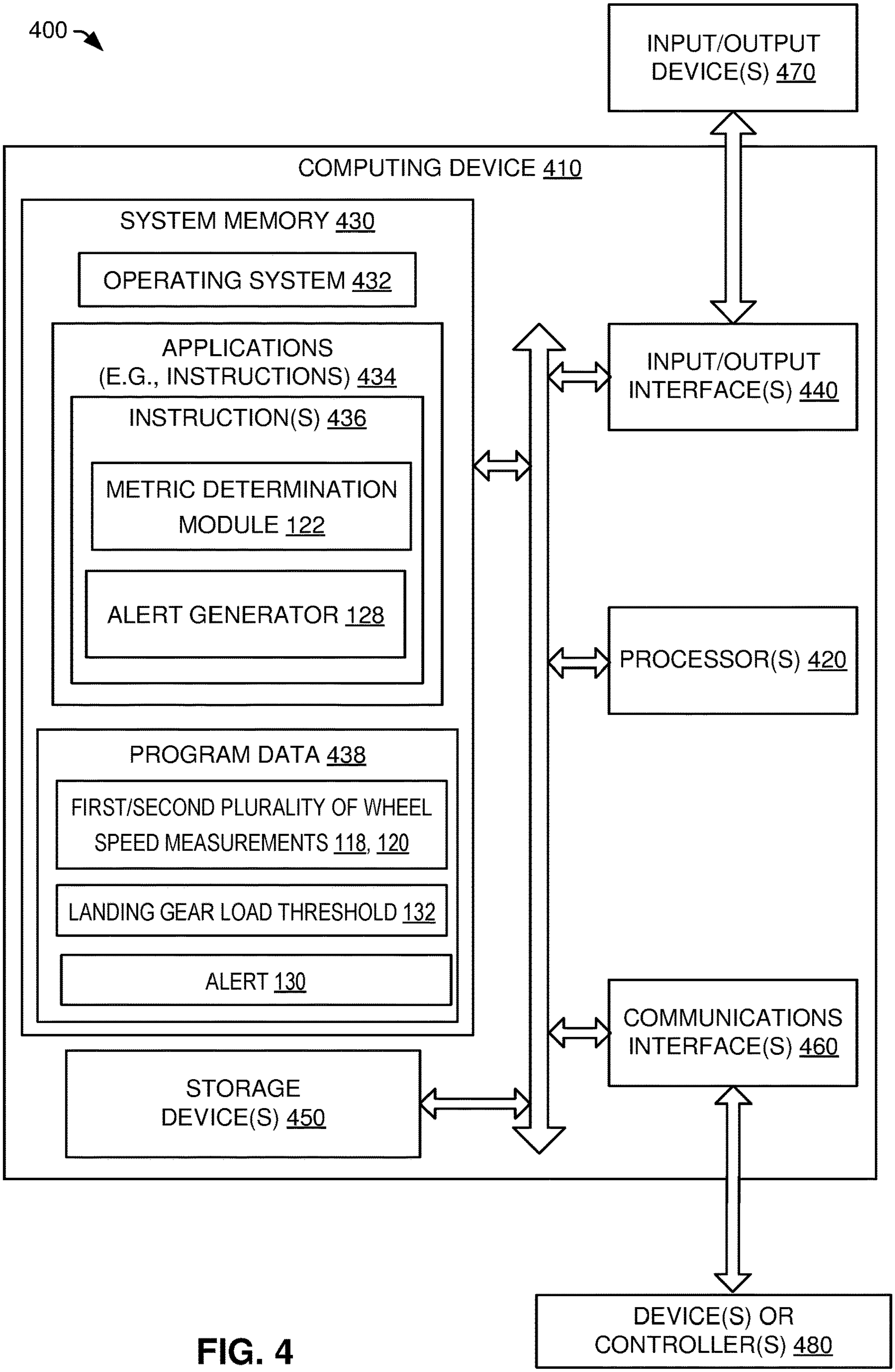
FIG. 4 is a block diagram of a computing environment including a computing device configured to support aspects of computer-implemented methods and computer-executable program instructions (or code), in accordance with some examples of the subject disclosure.

FIG. 4 is a block diagram of a computing environment 400 including a computing device 410 configured to support aspects of computer-implemented methods and computer-executable program instructions (or code), in accordance with some examples of the subject disclosure. For example, the computing device 410, or portions thereof, is configured to execute instructions to initiate, perform, or control one or more operations described in more detail above with reference to FIGS. 1-3. In a particular aspect, the computing device 410 can include, correspond to, or be included within the computing device 102 of FIG. 1, one or more servers, one or more virtual devices, or a combination thereof.

The computing device 410 includes one or more processors 420. In a particular aspect, the processor(s) 420 corresponds to the processor(s) 106 of FIG. 1. The processor(s) 420 are configured to communicate with system memory 430, one or more storage devices 450, one or more input/output interfaces 440, one or more communications interfaces 460, or any combination thereof. The system memory 430 includes volatile memory devices (e.g., random access memory (RAM) devices), nonvolatile memory devices (e.g., read-only memory (ROM) devices, programmable read-only memory, and flash memory), or both. The system memory 430 stores an operating system 432, which can include a basic input/output system for booting the computing device 410 as well as a full operating system to enable the computing device 410 to interact with users, other programs, and other devices. The system memory 430 stores system (program) data 438, such as first plurality of wheel speed measurements 118 and/or the second plurality of wheel speed measurements 120, the landing gear load threshold 132, the alert 130 of FIG. 1, or a combination thereof.

The system memory 430 includes one or more applications 434 (e.g., sets of instructions) executable by the processor(s) 420. As an example, the one or more applications 434 include the instructions 436 executable by the processor(s) 420 to initiate, control, or perform one or more operations described with reference to FIGS. 1-3. To illustrate, the one or more applications 434 include the instructions 436 executable by the processor(s) 420 to initiate, control, or perform one or more operations described with reference to receiving the wheel speed measurements 118, 120 of FIG. 1, determining the landing gear load metric 124, and generating the alert 130.

In a particular implementation, the system memory 430 includes a non-transitory, computer readable medium (e.g., a computer-readable storage device) storing the instructions 436 that, when executed by the processor(s) 420, cause the processor(s) 420 to initiate, perform, or control operations for monitoring a gear retract braking load alleviation system. The operations include receiving, from a wheel speed sensor associated with a wheel of a landing gear during an in-air operation, a plurality of wheel speed measurements. The operations also include determining a landing gear load metric based on the plurality of wheel speed measurements. The operations also include generating, in response to the landing gear load metric satisfying a landing gear load threshold, an alert indicating a potential maintenance issue associated with the landing gear.

The one or more storage devices 450 include nonvolatile storage devices, such as magnetic disks, optical disks, or flash memory devices. In a particular example, the storage devices 450 include both removable and non-removable memory devices. The storage devices 450 are configured to store an operating system, images of operating systems, applications (e.g., one or more of the applications 434), and program data (e.g., the program data 438). In a particular aspect, the system memory 430, the storage devices 450, or both, include tangible computer-readable media. In a particular aspect, one or more of the storage devices 450 are external to the computing device 410.

The one or more input/output interfaces 440 enable the computing device 410 to communicate with one or more input/output devices 470 to facilitate user interaction. For example, the one or more input/output interfaces 440 can include a display interface, an input interface, or both. For example, the input/output interface 440 is adapted to receive input from a user, to receive input from another computing device, or a combination thereof. In some implementations, the input/output interface 440 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 470 includes one or more user interface devices and displays, including some combination of buttons, keyboards, pointing devices, displays, speakers, microphones, touch screens, and other devices.

The processor(s) 420 are configured to communicate with devices or controllers 480 via the one or more communications interfaces 460. For example, the one or more communications interfaces 460 can include a network interface. The devices or controllers 480 can include, for example, the first wheel speed sensor(s) 104, the second wheel speed sensor(s) 110 of FIG. 1, or a combination thereof.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIGS. 1-3. In some implementations, part or all of one or more of the operations or methods of FIGS. 1-3 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following examples:

According to Example 1, a method includes receiving, from a wheel speed sensor associated with a wheel of a landing gear during an in-air operation, a plurality of wheel speed measurements; determining a landing gear load metric based on the plurality of wheel speed measurements; and, in response to the landing gear load metric satisfying a landing gear load threshold, generating an alert indicating a potential maintenance issue associated with the landing gear.

Example 2 includes the method of Example 1, the method also includes receiving, from a second wheel speed sensor associated with a second wheel of the landing gear, a second plurality of wheel speed measurements, wherein said determining the landing gear load metric comprises determining a wheel speed metric for the wheel and a second wheel speed metric for the second wheel, the second wheel speed metric based on the second plurality of wheel speed measurements.

Example 3 includes the method of Example 1 or Example 2, wherein said determining the landing gear load metric comprises analyzing the plurality of wheel speed measurements to determine the wheel speed metric.

Example 4 includes the method of Example 3, wherein the wheel speed metric comprises a wheel acceleration metric.

Example 5 includes the method of Example 3 or Example 4, wherein the plurality of wheel speed measurements comprises a plurality of wheel position measurements.

Example 6 includes the method of any of Examples 1 to 5, wherein said determining the landing gear load metric comprises determining the landing gear load metric based on a dynamic model of the landing gear.

Example 7 includes the method of Example 6, and further includes filtering an input of the dynamic model as part of an error reduction process.

Example 8 includes the method of Example 6 or Example 7, and further includes filtering an output of the dynamic model as part of an error correction process.

Example 9 includes the method of any of Examples 6 to 8, wherein the alert is based on a characteristic of the dynamic model.

Example 10 includes the method of Example 9, wherein the potential maintenance issue is associated with a particular operating mode.

According to Example 11, a system includes one or more processors configured to receive, from a wheel speed sensor associated with a wheel of a landing gear, a plurality of wheel speed measurements; determine a landing gear load metric based on the plurality of wheel speed measurements;

and, in response to a determination that the landing gear load metric satisfies a landing gear load threshold, generate an alert indicating a potential maintenance issue associated with the landing gear.

Example 12 includes the system of Example 11, wherein the one or more processors are further configured to receive, from a second wheel speed sensor associated with a second wheel of the landing gear, a second plurality of wheel speed measurements, wherein said determining the landing gear load metric includes determining a wheel speed metric for the wheel and a second wheel speed metric for the second wheel, wherein the second wheel speed metric is based on the second plurality of wheel speed measurements. Determining the landing gear load metric also includes using a dynamic model of the landing gear to determine the landing gear load metric based on the wheel speed metric and the second wheel speed metric.

Example 13 includes the system of Example 11 or Example 12, wherein said determine the landing gear load metric comprises perform an analysis of the plurality of wheel speed measurements to determine the wheel speed metric.

Example 14 includes the system of Example 13, wherein the wheel speed metric comprises a wheel acceleration metric.

Example 15 includes the system of Example 13 or Example 14, wherein the plurality of wheel speed measurements comprises a plurality of wheel position measurements.

Example 16 includes the system of any of Examples 11 to 15, wherein said determine the landing gear load metric is based on a dynamic model of the landing gear.

Example 17 includes the system of Example 16, wherein the one or more processors are further configured to filter an input of the dynamic model as part of an error reduction process.

Example 18 includes the system of Example 16 or Example 17, wherein the one or more processors are further configured to filter an output of the dynamic model as part of an error correction process.

Example 19 includes the system of any of Examples 16 to 18, wherein the alert is based on a characteristic of the dynamic model.

Example 20 includes the system of Example 19, wherein the potential maintenance issue is associated with a particular operating mode.

According to Example 21, a non-transitory, computer-readable medium comprising instructions that, when executed by one or more processors, cause the one or more processors to receive, from a wheel speed sensor associated with a wheel of a landing gear, a plurality of wheel speed measurements; determine a landing gear load metric based on the plurality of wheel speed measurements; and, in response to a determination that the landing gear load metric satisfies a landing gear load threshold, generate an alert indicating a potential maintenance issue associated with the landing gear.

Example 22 includes the non-transitory, computer-readable medium of Example 21, wherein the instructions, when executed by the one or more processors, further cause the one or more processors to receive, from a second wheel speed sensor associated with a second wheel of the landing gear, a second plurality of wheel speed measurements, and wherein said determine the landing gear load metric comprises determine a wheel speed metric for the wheel and a second wheel speed metric for the second wheel, wherein the second wheel speed metric is based on the second plurality of wheel speed measurements.

Example 23 includes the non-transitory, computer-readable medium of Example 21 or Example 22, wherein said determine the landing gear load metric includes perform an analysis of the plurality of wheel speed measurements to determine the wheel speed metric.

Example 24 includes the non-transitory, computer-readable medium of Example 23, wherein the wheel speed metric comprises a wheel acceleration metric.

Example 25 includes the non-transitory, computer-readable medium of Example 23 or Example 24, wherein the plurality of wheel speed measurements comprises a plurality of wheel position measurements.

Example 26 includes the non-transitory, computer-readable medium of any of Examples 21 to 25, wherein said determine the landing gear load metric is based on a dynamic model of the landing gear.

Example 27 includes the non-transitory, computer-readable medium of Example 26, wherein the instructions, when executed by the one or more processors, further cause the one or more processors to filter an input of the dynamic model as part of an error reduction process.

Example 28 includes the non-transitory, computer-readable medium of Example 26 or Example 27, wherein the instructions, when executed by the one or more processors, further cause the one or more processors to filter an output of the dynamic model as part of an error correction process.

Example 29 includes the non-transitory, computer-readable medium of any of Examples 26 to 28, wherein the alert is based on a characteristic of the dynamic model.

Example 30 includes the non-transitory, computer-readable medium of Example 29, wherein the potential maintenance issue is associated with a particular operating mode.

What is claimed is:

1. A method comprising:

receiving, from a wheel speed sensor associated with a wheel of a landing gear during an in-air operation, a plurality of wheel speed measurements;

determining a landing gear load metric based on the plurality of wheel speed measurements, wherein said determining the landing gear load metric comprises determining the landing gear load metric based on a dynamic model of the landing gear; and in response to the landing gear load metric satisfying a landing gear load threshold, generating an alert indicating a potential maintenance issue associated with the landing gear.

2. The method of claim 1, further comprising receiving, from a second wheel speed sensor associated with a second wheel of the landing gear, a second plurality of wheel speed measurements, wherein said determining the landing gear load metric comprises determining a wheel speed metric for the wheel and a second wheel speed metric for the second wheel, and wherein the second wheel speed metric is based on the second plurality of wheel speed measurements.

3. The method of claim 1, wherein said determining the landing gear load metric comprises analyzing the plurality of wheel speed measurements to determine a wheel speed metric.

4. The method of claim 3, wherein the wheel speed metric comprises a wheel acceleration metric.

5. The method of claim 3, wherein the plurality of wheel speed measurements comprises a plurality of wheel position measurements.

6. The method of claim 1, further comprising filtering an input of the dynamic model as part of an error reduction process.

7. The method of claim 1, further comprising filtering an output of the dynamic model as part of an error correction process.

8. The method of claim 1, wherein the alert is based on a characteristic of the dynamic model.

9. The method of claim 8, wherein the potential maintenance issue is associated with a particular operating mode.

10. A system comprising:

one or more processors configured to:

receive, from a wheel speed sensor associated with a wheel of a landing gear, a plurality of wheel speed measurements;

determine a landing gear load metric based on the plurality of wheel speed measurements, wherein said determining the landing gear load metric is based on a dynamic model of the landing gear; and in response to a determination that the landing gear load metric satisfies a landing gear load threshold, generate an alert indicating a potential maintenance issue associated with the landing gear.

11. The system of claim 10, wherein said determine the landing gear load metric comprises perform an analysis of the plurality of wheel speed measurements to determine a wheel speed metric.

12. The system of claim 11, wherein the wheel speed metric comprises a wheel acceleration metric.

13. The system of claim 11, wherein the plurality of wheel speed measurements comprises a plurality of wheel position measurements.

14. The system of claim 10, wherein the one or more processors are further configured to filter an input of the dynamic model as part of an error reduction process.

15. The system of claim 10, wherein the one or more processors are further configured to filter an output of the dynamic model as part of an error correction process.

16. The system of claim 10, wherein the alert is based on a characteristic of the dynamic model.

17. The system of claim 16, wherein the potential maintenance issue is associated with a particular operating mode.

18. A non-transitory, computer-readable medium comprising instructions that, when executed by one or more processors, cause the one or more processors to:

receive, from a wheel speed sensor associated with a wheel of a landing gear, a plurality of wheel speed measurements;

determine a landing gear load metric based on the plurality of wheel speed measurements, wherein said determining the landing gear load metric is based on a dynamic model of the landing gear; and in response to a determination that the landing gear load metric satisfies a landing gear load threshold, generate an alert indicating a potential maintenance issue associated with the landing gear.

19. The non-transitory, computer-readable medium of claim 18, wherein the instructions, when executed by the one or more processors, further cause the one or more processors to filter an input of the dynamic model as part of an error reduction process.

20. The non-transitory, computer-readable medium of claim 18, wherein the instructions, when executed by the one or more processors, further cause the one or more processors to filter an output of the dynamic model as part of an error correction process.

* * * * *